(12) United States Patent
Meling et al.

(10) Patent No.: US 11,271,885 B2
(45) Date of Patent: Mar. 8, 2022

(54) MESSAGE GENERATION USING ORGANIZATIONAL DATA

(71) Applicant: Microsoft Technology Licensing, LLC, Redmond, WA (US)

(72) Inventors: Jon Meling, Redmond, WA (US); Jeremy Grubaugh, Redmond, WA (US); Alexander Primo Lopez, Renton, WA (US); Livani Pillay, Seattle, WA (US); Reid Maker, Issaquah, WA (US); David Dupree Harris, Seattle, WA (US); Andreas Eide, Oslo (NO); Daniel Duarte, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 106 days.

(21) Appl. No.: 16/656,746

(22) Filed: Oct. 18, 2019

(65) Prior Publication Data
US 2021/0119954 A1    Apr. 22, 2021

(51) Int. Cl.
*H04L 12/58* (2006.01)
*H04L 51/48* (2022.01)
*G06F 16/953* (2019.01)
*G06F 40/205* (2020.01)
*G06F 40/295* (2020.01)
(Continued)

(52) U.S. Cl.
CPC ........... *H04L 51/28* (2013.01); *G06F 3/0481* (2013.01); *G06F 16/953* (2019.01); *G06F 40/205* (2020.01); *G06F 40/295* (2020.01); *G06Q 10/107* (2013.01); *H04L 51/32* (2013.01)

(58) Field of Classification Search
None
See application file for complete search history.

(56) References Cited

U.S. PATENT DOCUMENTS 5,990,886 A    11/1999 Serdy et al.
7,734,696 B2    6/2010 Osterberg et al.
(Continued)

OTHER PUBLICATIONS

"Company Directory, Org chart, and Basic User Management", Retrieved from: https://help.small-improvements.com/article/306-company-directory-org-chart-and-basic-user-management, Aug. 12, 2019, 13 Pages.

(Continued)

*Primary Examiner* — Mandrita Brahmachari
(74) *Attorney, Agent, or Firm* — Shook, Hardy and Bacon, L.L.P.

(57) ABSTRACT

Techniques of electronic message generation using organizational data are disclosed herein. One example technique includes recognizing a contact a user previously communicated with in an input to an address field of a draft email in the email client. The technique can then include determining whether the input also contains a preset keyword or key phrase indicating an intention of the user to send the draft email to a related entity of the contact. In response to determining that the input also contains a preset keyword or key phrase, the technique includes querying a relationship map corresponding to the contact for an identity and email address of the related entity of the contact and surface the identity and email address in the email client as a suggested destination address for selection by the user.

20 Claims, 7 Drawing Sheets

(51) Int. Cl.
    *G06F 3/0481*     (2022.01)
    *G06Q 10/10*     (2012.01)
    *H04L 51/52*     (2022.01)

(56) References Cited

U.S. PATENT DOCUMENTS

| | | |
|---|---|---|
| 2009/0248819 A1 | 10/2009 | Hutchison et al. |
| 2013/0097527 A1* | 4/2013 | Scott .................. G06Q 10/107 715/752 |
| 2013/0159203 A1* | 6/2013 | Munzer .............. G06Q 10/1053 705/321 |
| 2015/0113071 A1 | 4/2015 | Deedwaniya et al. |
| 2015/0135043 A1 | 5/2015 | Apps et al. |
| 2015/0156160 A1 | 6/2015 | Olsen et al. |
| 2016/0057095 A1 | 2/2016 | Fox et al. |

OTHER PUBLICATIONS

Graham, et al., "Use the People API in Microsoft Graph to get Information about the People most Relevant to you", Retrieved from: https://docs.microsoft.com/en-us/graph/people-example, Apr. 9, 2019, 22 Pages.

Kamau, Grace, "Organizational Chart", Retrieved from: https://my.axerosolutions.com/spaces/5/communifire-documentation/wiki/view/26684/organizational-chart, Apr. 25, 2018, 7 Pages.

Karagianns, et al., "Behavioral Profiles for Advanced Email Features", In Proceedings of the 18th International Conference on World Wide Web, Apr. 20, 2009, pp. 711-720.

* cited by examiner

MESSAGE GENERATION USING ORGANIZATIONAL DATA

BACKGROUND

Electronic messaging involves transmitting various forms of messages via electronic signals. For example, an Electronic Mail ("email" or "e-mail") is a technique of exchanging messages among users using computers, smartphones, or other suitable types of computing devices. Email exchanges operate across computer networks such as the Internet or an intranet. Today's email systems are typically based on a store-and-forward model utilizing email servers to accept, process, forward, and store emails. Users with various computing devices can connect to email servers via computer networks to send and receive emails from one another. Other example types of electronic messages can include instant messages, text messages, and electronic message board posts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Electronic messages are typically formatted according to corresponding data structures with various data fields. For example, an email typically includes a message header, a message body, and optionally one or more attachments appended to the email message. A message header can include structured data fields such as address fields containing source/destination addresses (e.g., "To:", "Cc.," or "From"), and a subject field containing a suitable description of the email message. A message body can contain data, such as in plain text or Hypertext Markup Language text, representing information conveyed in the email message. Attachments can include Microsoft Word® documents, images, videos, or other suitable types of files appended to the email message.

To provide convenience for entering destination addresses of recipients during message composition, various electronic messaging systems may provide a facility for supplying address suggestions. For example, an email server can be configured to provide suggestions of email addresses based on accumulated contact data such as email addresses of other users a sender has previously communicated with. Based on the accumulated contact data, the email server can provide email address suggestions to the sender when or even before the sender starts typing in an address field, for example, the "To:" field in an email client. For instance, if the sender has previously sent emails to and/or received email from a contact named "Jeff" at "jeff@exampleinc.com," the email server can provide a suggestion to the sender (e.g., "jeff@exampleinc.com") when the sender clicks on the "To:" field in the email client, or when the sender types only an "j" in the "To:" field. The provided suggestion can be a balloon, a popup window, or represented as other suitable interface elements. The sender can then select the suggested email address (e.g., by clicking on the suggestion balloon or pressing "Enter" on a keyboard) without typing in the entire email address for "Jeff."

The foregoing convenience, however, may not be available when a sender is trying to send an email message to one or more other users related to a contact the sender previously communicated with in addition to or in lieu of the contact. For example, a sender may desire to send an email to reports of "Jeff" in an organization (e.g., Example Inc.). To compose the email, the sender may have to look up identities of those reporting to "Jeff" in Example Inc. from, for example, an organization chart of Example Inc. The sender may then manually enter email addresses of reports of "Jeff" into the "To:" or "Cc" field if the sender has not previously communicated with the reports of "Jeff." In another example, a sender may desire to send an email to a manager, one or more co-workers, support staff, and/or other suitable people or related entities to "Jeff" in Example Inc. Similarly, the sender may need to look up identities and email addresses of such related entities in the organization chart and manually enter the email addresses into the "To:" or "Cc" field. The foregoing process for composing emails to related entities can be cumbersome, inefficient, and prone to errors.

Several embodiments of the disclosed technology can address certain aspects of the foregoing difficulties by implementing automatic message generation or destination address lookup for people, groups, departments, or other suitable related entities to a contact in an organization or a social network as reports, managers, co-workers, support staff, friends, followers, or other suitable relationships. In the following description, email generation or email address lookup in an email client is used as examples to illustrate certain aspects of the disclosed technology. However, aspects of the disclosed technology can also be implemented in collaboration applications, instant message systems, and/or other suitable communication systems. In further embodiments, aspects of the disclosed technology can also be implemented in a computing system without a visual user interface. For example, a digital assistant (e.g., Microsoft Cortana®, Google Assistant®, Apple Siri®)) can be utilized to allow verbal interaction with a user for message address lookup disclosed herein.

In one implementation, a directory server of an organization can be configured to manage data of directory information in the organization. In one example, the directory information can include an organization chart of the organization showing entities, positions, and relationships between the entities such as "reporting to," "co-worker of," and/or other suitable types of relationships in the organization. The directory information can also include data of a description, contact information (e.g., email addresses, phone numbers, office locations, and fax numbers), documents or other files authored by and/or edited by individual entities in the organization. In other examples, the directory information can also include a current state (e.g., "available," "busy," and "offline"), a photo, a professional or personal social network webpage, or other suitable types of information of the entities. In other implementations, the directory server can also be configured to track friends, followers, subscribers, or other suitable relationships among users of a social network or other suitable types of network.

In accordance with certain aspects of the disclosed technology, the directory server can be configured to provide a facility to generate email messages to one or more related entities of a contact from an organization chart, a connection map, an entity graph, or other suitable types of a relationship map of the contact and the related entities. In certain embodiments, the directory server can be configured to provide an interface element (e.g., a button) for generating an email message to one or more related entities to a contact on a user interface of an organization chart. For example, when a sender browses the organization chart and locates the contact "Jeff," the user interface can be configured to show entities "Jeff" reports to, manages, is supported by, or other suitable information. The organization chart can also include a button labeled "Email Report(s)" on the user interface. Upon detecting a user actuation of the button "Email Report(s)", the directory server can be configured to launch a standalone or web-based email client, query the organization chart for reports of "Jeff," and automatically provide email addresses of the reports as suggestions to the sender in a draft email in the launched email client. Upon receiving a selection of the suggestions, the email client can automatically populate the "To:" field with the selected email addresses without requiring the sender to manually enter the email addresses into the draft email. As such, the sender can efficiently generate and transmit an email message to reports of "Jeff" right from the organization chart.

In other examples, the user interface of the organization chart may also be configured to include one or more additional button(s) labeled "Email Manager," "Email Co-worker," or other suitable labels to allow the sender to email the manager, co-workers, support staff, or other suitable entities of "Jeff" right from the organization chart. In other embodiments, the directory server can also be configured to provide options to set a number of levels of relationships for the provided suggestions. For instance, one, two, three, or other suitable levels of reports or managers may be selected for providing the suggestions. In other embodiments, a similar interface element can be provided on a user interface of a social network or a connection map of a user, e.g., "Amanda." The interface element can be configured to allow automatic generation of emails, instant messages, or other suitable types of messages to friends, followers, or other suitable related entities of "Amanda."

In another implementation, an email server can be configured to perform automatic email address lookup by querying the directory server. In certain embodiments, a sender can initiate email composition by generating a draft email in a stand-alone or web-based email client. During composition, the sender can enter an input of text into an address field such as the "To:" or "Cc:" field. In response to detecting the input of text to the address field, the email client or the email server can be configured to parse the text of the input and provide email address suggestions accordingly. For example, when the sender enters "Jeff" into the address field, the email server can be configured to provide the email address "jeff@exampleinc.com" corresponding to "Jeff" as a suggestion in a balloon or other suitable types of interface element.

In accordance with embodiments of the disclosed technology, the email client or the email server can also be configured to detect certain keywords or key phrases in the parsed text and provide suggestions of email addresses of reports, managers, co-workers, or other suitable types of related entities to a contact. For example, when the sender enters "Jeff directs" as the text of the input, the email server can be configured to detect a keyword, e.g., "directs" that indicates the sender's intention to send the draft email to reports of "Jeff." In response, the email client or the email server can be configured to query the directory server for identities and email addresses of any reports of "Jeff" according to the organization chart of the organization. Upon receiving a query result from the directory server, the email client or the email server can surface and provide the identities and email addresses of the reports as suggestions to the sender. Upon receiving a selection of the suggestions by the sender, the email client or the email server can be configured to automatically populate the address field with the suggested email addresses. In further embodiments, various other suitable keywords or key phrases may be used for providing suggestions of reports, managers, co-workers, or other suitable types of related entities to the contact. For example, "manages" may be used to indicate the sender's intention to send the email message to reports of a contact. "Reports to" may be used to indicate the sender's intention to send the email message to a manager of a contact. "Works with" may be used to indicate the sender's intention to send the email message to co-workers of a contact. "Supported by" may be used to indicate the sender's intention to send the email message to support staff of a contact.

Several embodiments of the disclosed technology can thus allow efficient communications with reports, managers, co-workers, support staff, friends, followers, or other suitable types of related entities to a contact. Instead of having to search for identities and email addresses of related entities from an organization chart or other sources and manually entering the email addresses into a draft email, the directory server and/or the email server can independently or cooperatively facilitate generation of new emails as well as automatically email address lookup for the related entities. As such, a sender can readily compose and send email messages not only to a contact, but also to related entities of the contact. As a result, compute load, network bandwidth, and/or other suitable types of computing resources at a client device of the sender, the directory server, and/or the email server may be reduced.

DETAILED DESCRIPTION

Figure 1A:
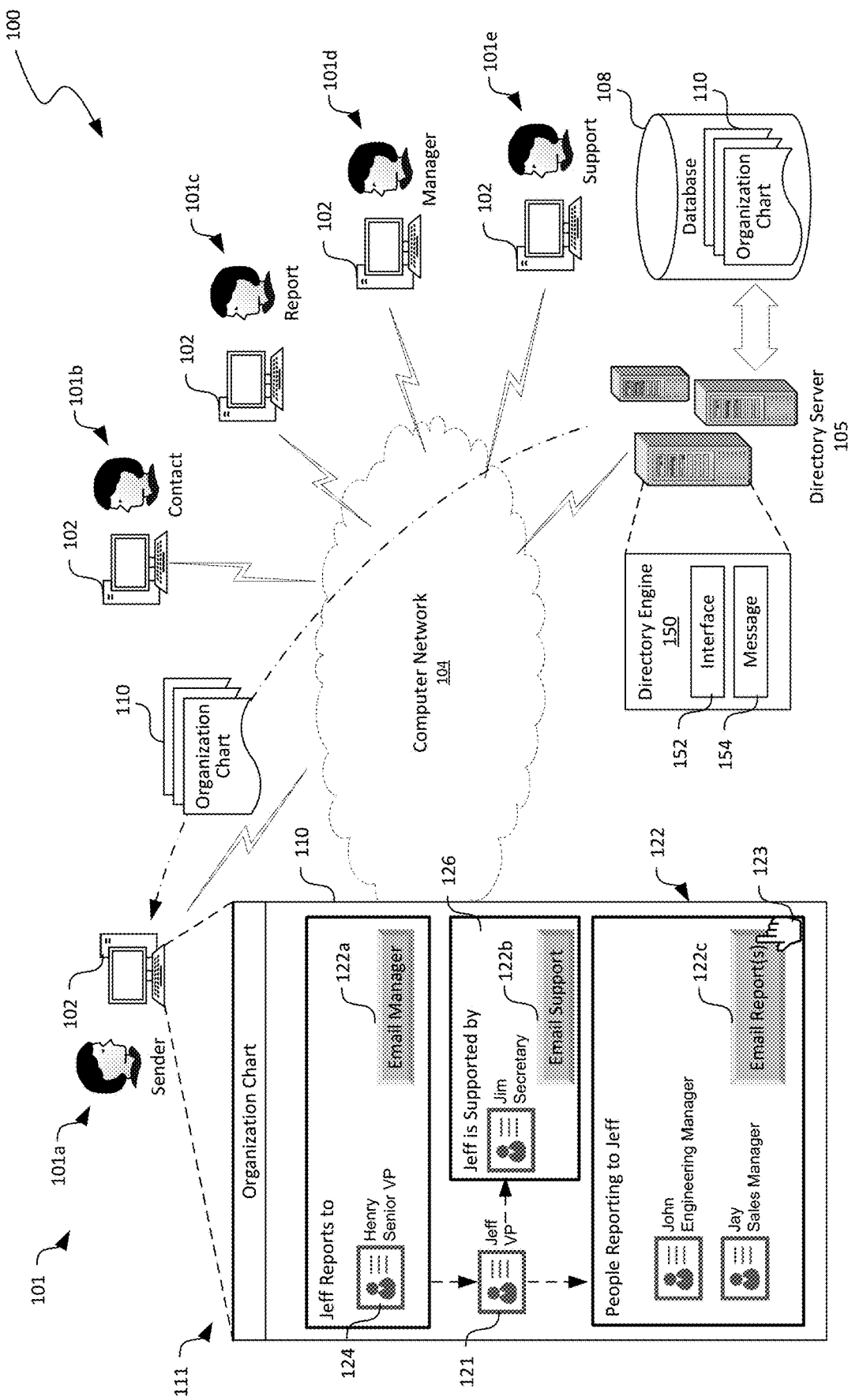
FIGS. 1A and 1B are schematic diagrams illustrating a computing system implementing email generation using organization data during certain operational stages in accordance with embodiments of the disclosed technology.

Certain embodiments of systems, devices, components, modules, routines, data structures, and processes for automatic image classification in computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1A-5.

As used herein, the term "directory server" generally refers to one or more computers that are configured to execute suitable applications for providing directory services that maintain, update, and manage directory information of multiple entities and relationships among the multiple entities. In one example, a directory service can be configured to maintain an organization chart and contact information of multiple users, groups, departments, teams, or other suitable related entities in an organization. In another example, a directory service can be configured to maintain a connection map or other suitable types of relationship map of users in a social network or other suitable types of network. One example of an application suitable for providing a directory service is Oracle Internet Directory provided by Oracle Corp. of Redwood City, Calif.

A "relationship map" as used herein generally refers to data representing relationships of entities in an organization, social network, or other suitable groupings. Examples of a relationship map can include an organization chart, a connection map, an entity graph, or other suitable data of relationship representations. A relationship map can include data stored in various suitable data structures. For instance, an organization chart can include relational database records that can be rendered as graphical representation of a hierarchy of entities in an organization. In other examples, a relationship map can include data stored in an array, table, or other suitable data structures.

A "related entity" generally refers to an entity in an organization or social network that is related in some way to a contact in the organization or social network. For example, a related entity can be a report, manager, co-worker, or support staff of a person in an organization. In another example, a related entity can be a group, department, or team to which the contact belongs. In further examples, a related entity can also include a friend, follower, or subscriber of the contact on a social network.

As used herein, a "contact" generally refers to a person, group, department, team, or other suitable types of entity with which a sender of an email has previously exchanged email(s) or otherwise had contact. Information associated with a contact can be stored as a record of contact data on a client device and/or on an email server. The term "contact data" generally refers to data representing contact information of one or more of a person, an organization, a group, a department, a team, or other suitable types of entity that a user has communicated with. In one example, contact data can include data records of email addresses, phone numbers, instant message aliases, social network aliases, or other suitable contact data according to which a user can communicate with other users. Contact data can also include time stamps, a number of messages per period, or other suitable parameters associated with the previous communications. In one particular example, a record of contact data of a user can include one or more email addresses of other users the user has communicated with previously.

As used herein, the term "email server" generally refers to one or more computers that execute applications that are configured to receive incoming emails from senders and forward outgoing emails to recipients via a computer network, such as the Internet. Examples of such applications include Microsoft Exchange®, qmail, Exim, and sendmail. An email server can maintain and/or access one or more inboxes for corresponding users. As used herein, an "inbox" is a file folder configured to contain data representing incoming emails for a user. The email server can also maintain and/or access one or more outboxes configured to contain outgoing emails and/or other suitable mailboxes.

An "email client" is a computer application that is configured to access and manage a user's emails. In certain implementations, an email client can be a standalone application whose primary or most visible function is for accessing and managing emails. One example standalone email client is Microsoft Outlook® provided by Microsoft Corp. of Redmond, Wash. In other implementations, an email client can also include a web-based application (e.g., a web browser) that is configured to provide email management, composition, and reception functions. An example web-based email client is Gmail® provided by Google Inc. of Mountain View, Calif. In further implementations, an email client can be an application developed for a tablet computer, a smartphone, or other suitable computing platforms.

In certain communications systems, an address suggestion feature is provided to users to allow efficient lookup of the email address of a contact of a sender. The address suggestion feature, however, may not be available when the sender is trying to send an email message to one or more other users related to the contact in addition to or in lieu of the contact, particularly when the sender has not previously communicated with the related users. Instead, the sender may need to look up identities and/or email addresses of the other users in a relationship map and manually entering the email addresses into an address field of a draft email on an email client. Such a process for composing emails to the other users can be cumbersome, inefficient, and prone to errors.

Several embodiments of the disclosed technology can address certain aspects of the foregoing difficulties by implementing automatic message generation or destination address lookup for people, groups, departments, or other suitable related entities to a contact in an organization or a social network as reports, managers, co-workers, support staff, friends, followers, or other suitable relationships. For example, an interface element can be provided on a relationship map to launch an email client, query the relationship map for the other users, and automatically provide email addresses of the other users as a suggestion to the sender in the draft email. Upon receiving a selection of the suggestion, the email client can automatically populate the "To:" field with the selected email addresses without having the sender to manually enter the email addresses into the draft email. As such, the sender can efficiently generate and transmit an email message to other users related to the contact from the relationship map.

In another example, an email server can be configured to perform automatic email address lookup by querying the directory server. During composition, the sender can enter an input into an address field such as the "To:" or "Cc:" field of a draft email. In response to detecting the input to the address field, the email client or the email server can be configured to parse the text to recognize the contact and one or more keyword or key phrase indicating the user's intention to send the draft email to the other users related to the contact. In response to the recognized one or more keyword or key phrase, the email client or the email server can be configured to query the directory server for identities and email addresses of the other users and surface the identities and email addresses as suggestions to the user. As such, several embodiments of the disclosed technology can thus allow efficient communications between the sender and the other users related to the contact, as described in more detail below with reference to FIGS. 1A-5.

In the following description, email generation or email address lookup in an email client is used as examples to illustrate certain aspects of the disclosed technology. However, aspects of the disclosed technology can also be implemented in collaboration applications, instant message systems, and/or other suitable communication systems. In further embodiments, aspects of the disclosed technology can also be implemented in a computing system without a visual user interface. For example, a digital assistant (e.g., Microsoft Cortana®, Google Assistant®, Apple Siri®) can be utilized to allow verbal interaction with a user for email address lookup disclosed herein.

Figure 1B:
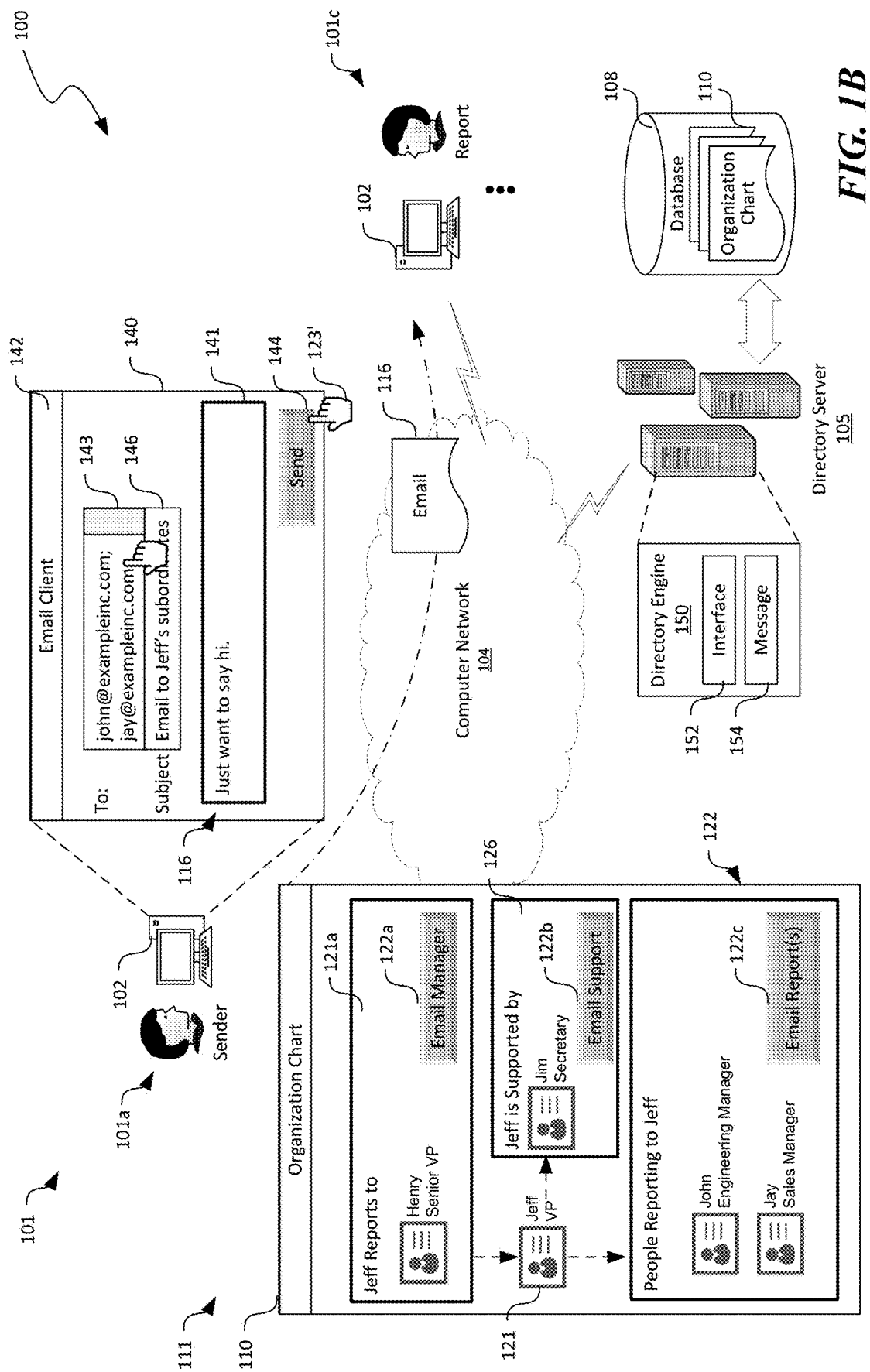

FIGS. 1A and 1B are schematic diagrams illustrating a computing system 100 implementing email generation using organization data during certain operational stages in accordance with embodiments of the disclosed technology. Even though embodiments of the disclosed technology are described below in the context of an organization having a directory server that maintains an organization chart, aspects of the disclosed technology can also be implemented in a social network or other suitable types of network maintaining a connection map or other suitable types of relationship map.

In FIGS. 1A and 1B and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 1A, the computing system 100 can include a computer network 104 interconnecting client devices 102 and one or more directory servers 105 (referred to as "directory server 105" herein for simplicity) interconnected with a database 108 containing records of an organization chart 110. The computer network 104 can include an intranet, a wide area network, the Internet, or other suitable types of network. Even though particular components of the computing system 100 are shown in FIG. 1, in other embodiments, the computing system 100 can also include additional and/or different components or arrangements. For example, in certain embodiments, the computing system 100 can also include additional network storage devices, additional servers, and/or other suitable components (not shown).

The client devices 102 can each include a computing device that facilitates corresponding users 101 (individually shown as "Sender 101a," "Contact 101b," "Report 101c," "Manager 101d," and "Support 101e") to access directory, email, and other suitable types of computing services provided by the directory server 105 and email server 106 (shown in FIG. 2A) via the computer network 104. For example, in the illustrated embodiment, the client devices 102 individually include a desktop computer. In other embodiments, the client devices 102 can also include laptop computers, tablet computers, smartphones, or other suitable computing devices. Even though five users 101 are shown in FIG. 1A for illustration purposes, in other embodiments, the computing system 100 can facilitate any suitable number of users 101 to access suitable types of computing services provided by the computing system 100.

The directory server 105 can be configured to maintain, update, and/or otherwise manage the organization chart 110 in the database 108. As shown in FIG. 1A, the directory server 105 can execute suitable instructions to provide a directory engine 150 having an interface component 152 and a message component 154. Though particular components of the directory engine 150 are shown in FIG. 1A, in other embodiments, the directory engine 150 can also include database management, network access, and/or other suitable types of components in addition to or in lieu of those shown in FIG. 1A.

The interface component 152 can be configured to provide a copy of the organization chart 110 to the client device 102 of the sender 101a in response to a request (not shown) from the sender 101. The organization chart 110 can include suitable data that can be rendered on the client device, for instance, in a web browser or other suitable user interface 111, as a graphical representation of an organization. For example, as shown in FIG. 1A, the organization chart 110 can be rendered to show a contact 121 (e.g., with a name "Jeff") and a position of the contact 121 in the organization (e.g., "VP"). The organization chart 110 can also show a manager 124 of the contact 121 (e.g., "Henry") and the manager's position (e.g., "Senior VP"), one or more reports 125 of the contact 121 (e.g., "John" and "Jay") and their positions (e.g., "Engineering Manager" and "Sales Manager," respectively), and a support 126 of the contact 121 (e.g., "Jim") as "Secretary." In other examples, the organization chart 110 can also show other entities (not shown) who are at the same level as the contact 121 as co-workers, groups and/or departments the contact 121 belongs to, or other suitable related entities of the contact 121.

In accordance with aspects of the disclosed technology, the user interface 111 can also include one or more interface elements 122 that are configured to facilitate generating emails to related entities of the contact 121. For example, in the illustrated embodiment in FIG. 1A, the interface elements 122 include first, second, and third buttons 122a-122c, respectively, that are individually labeled "Email Manager," "Email Support," and "Email Report(s)."

Actuation of these interface elements 122, for instance, as represented by the cursor 123 on the third button 122c, can trigger the directory engine 150 to initiate email composition to one of the related entities of the contact 121. For example, as shown in FIG. 1B, upon detecting an actuation on the third button 122c, the message component 154 can be configured cause an email client 140 be launched on the client device 102 with a draft email 116. The email client 140 can include an email interface 142 outputting, on the client device 102, an address field 143 (e.g., "To:" field), a subject field 146, and an email body 141 of the draft email 116. In other examples, the email interface 142 can include additional fields such as "Cc:," "Bcc:," and/or other suitable data fields (not shown).

The message component 154 can also be configured to query the organization chart 110 for one or more identities and email addresses of the reports and provide such information as suggestions to the sender 101a. For example, as shown in FIG. 1B, the email addresses (e.g., "john@exampleinc.com" and "jay@exampleinc.com") are shown in a dropdown menu in the "To:" field. In other examples, the suggested email addresses can also be shown in a balloon, popup window, or other suitable interface elements. Upon receiving a selection to select at least one by the sender 101a, the suggested email address(es) can be automatically inserted into the address field 143. In certain embodiments, a "select all" option may be provided as a balloon, popup window, or other suitable types of interface element. In other embodiments, the sender 101a can select the suggestions one at a time. In further embodiments, the suggested email addresses may be automatically populated in the "To:" field, and the sender 101a can delete any of the email addresses the sender does not wish to include. The sender 101a can further utilize the email client 140 to compose the draft email 116 by, for instance, providing a subject line to the subject field 146 and text to the email body 141. The sender 101a can then actuate a "Send" button 144 on the email client 140 to transmit the draft email 116 to the reports 101b (only one is shown for brevity) of the contact 121 (shown in FIG. 1A).

Figure 2A:
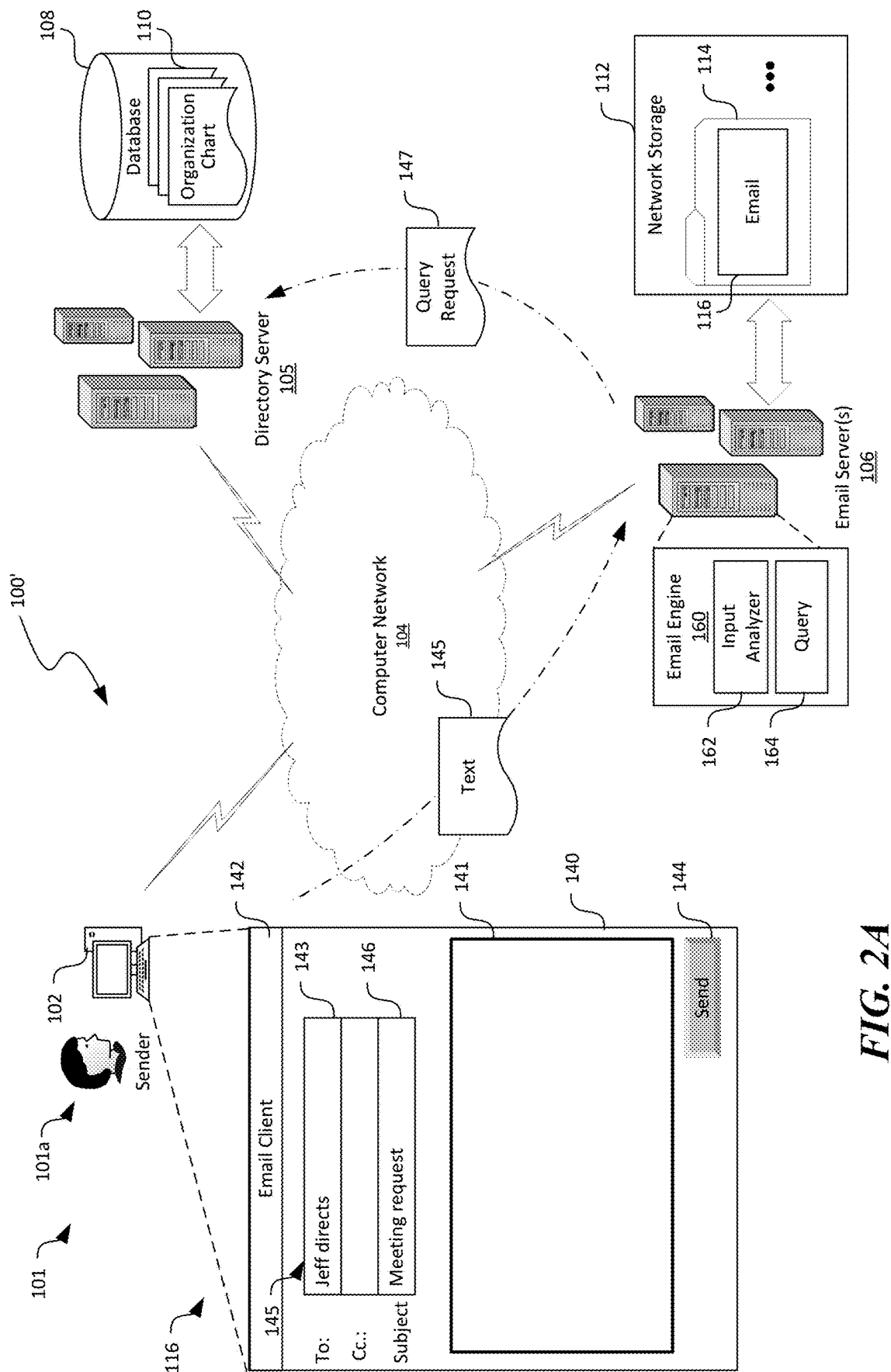
FIGS. 2A-2C are schematic diagrams illustrating another computing system implementing email generation using organization data during certain operational stages in accordance with embodiments of the disclosed technology.
Figure 2B:
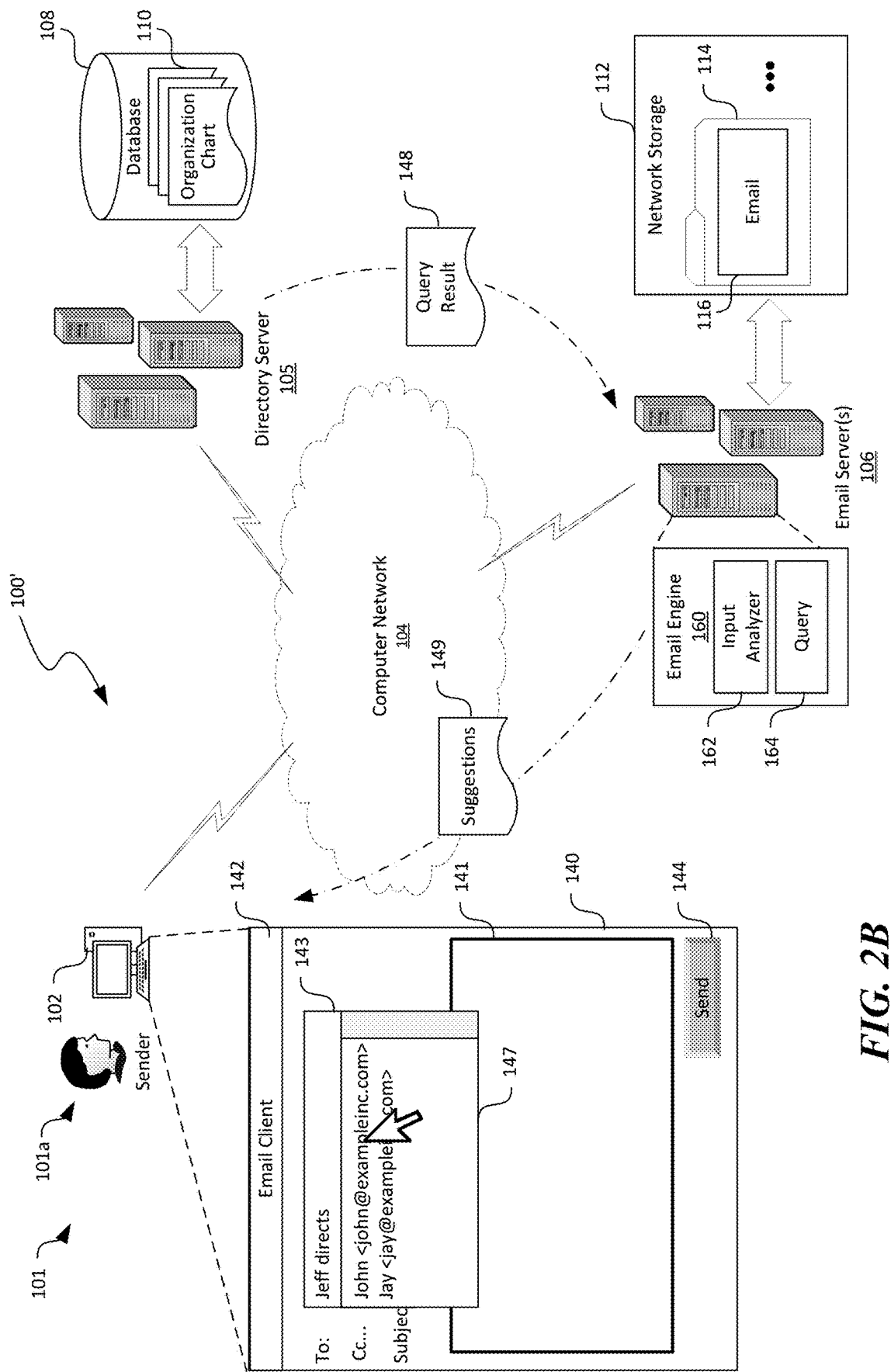
Figure 2C:
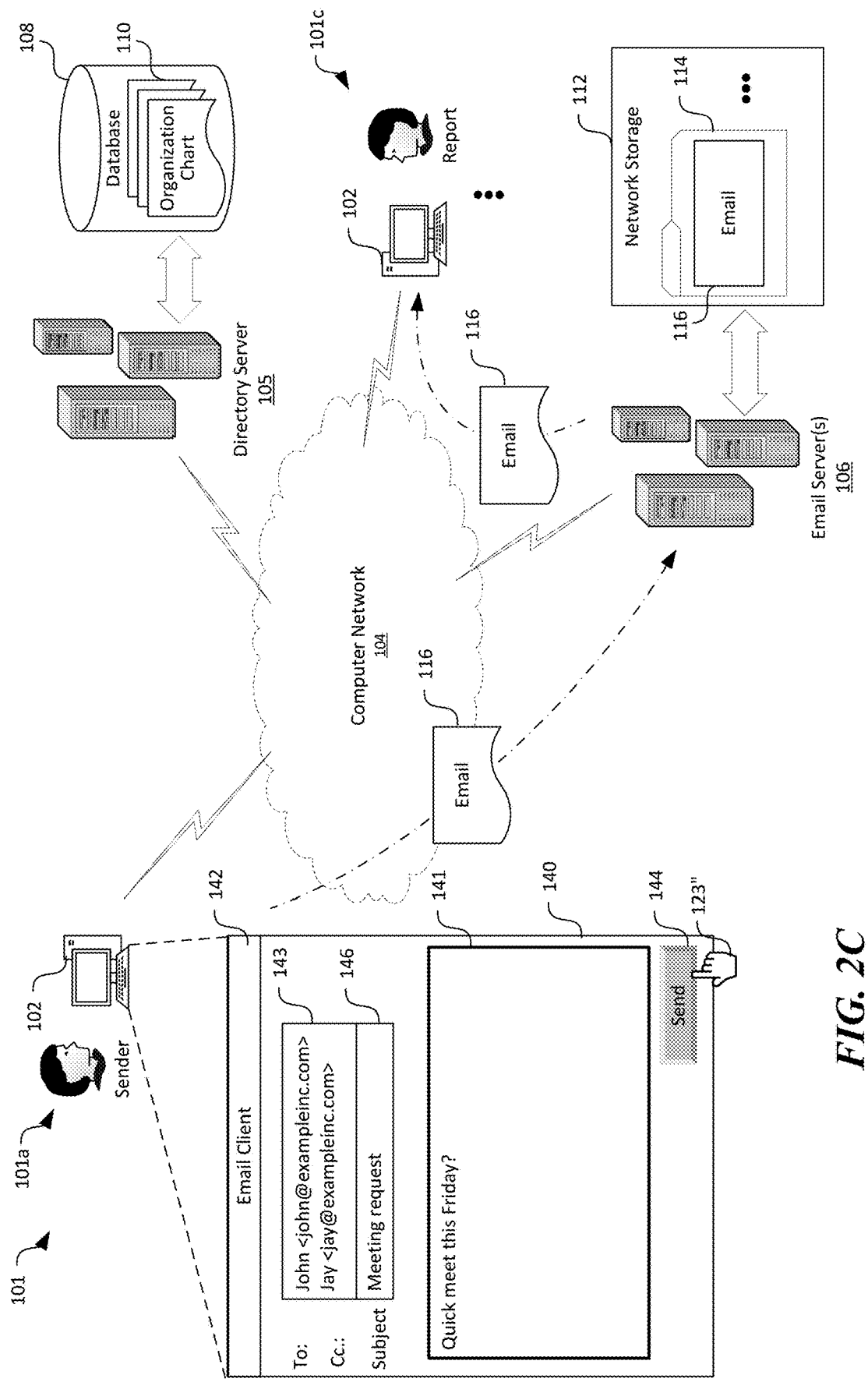

FIGS. 2A-2C are schematic diagrams illustrating another computing system 100' implementing email generation using organization data during certain operational stages in accordance with embodiments of the disclosed technology. The computing system 100' can include certain components generally similar to those in FIGS. 1A and 1B. For example, the computing system 100' can include the directory server 105 and one or more client devices 102 (only one is shown for brevity). Descriptions of such components are not repeated herein for conciseness.

As shown in FIG. 2A, the computing system 100' can also include one or more email servers 106 (referred to as "email server 106" herein for simplicity) interconnected with a network storage 112 containing one or more inboxes 114 (only one is shown for clarity). The email server 106 can be configured to facilitate email reception, storage, forwarding, and other related functionalities to the sender 101a via an email client 140 on the client device 102. For example, the email server 106 can receive incoming emails 116 to the sender 101a, store the incoming emails 116 in the inbox 114 in the network storage 112, and transmit a copy of the incoming emails 116 to the client device 102.

In certain embodiments, the email server 106 can also be configured to perform automatic email address lookup of related entities by querying the directory server 105. For example, as shown in FIG. 2A, the email server 106 can execute suitable instructions to provide an email engine 160 that includes an input analyzer 162 and a query component 164 operatively coupled to each other. In other examples, the email engine 160 can also include database management, network access, and/or other suitable types of components. In further embodiments, one or more of the foregoing components of the email engine 160 can be incorporated into the email client 140 to perform one or more operations of automatic email address lookup of related entities.

As shown in FIG. 2A, the sender 101a can initiate email composition on the client device 102 by generating a draft email 116 in the email client 140, which can be generally similar to the email client 140 in FIGS. 1A and 1B. During composition, the sender 101a can enter an input of text 145 into an address field 143 such as the "To:" field in the email interface 142. In response to detecting the input of text 145 to the address field 143, the input analyzer 162 can be configured to parse the text 145 of the input and recognize a name of a contact 121 (shown in FIG. 1A) and provide email address suggestions of related entities to the contact 121 upon detecting one or more preset keyword or key phrase. For example, as shown in FIG. 2A, when the sender 101a enters "Jeff directs" into the address field 143, the input analyzer 162 can be configured to recognize a name of contact 121, i.e., "Jeff." The input analyzer 162 can also detect that a preset keyword, e.g., "directs" is included in the parsed text 145.

In response to detecting the keyword, the input analyzer 162 can be configured to instruct the query component 164 to query the directory server 105 for identities and email addresses of related entities of the contact 121 corresponding to the detected keyword. For example, the keyword "directs" can be preset to correspond to reports of the contact 121. As such, the query component 162 can be configured to query the directory server 105 for any reports of the contact 121 by transmitting a query request 147 to the directory server 105. The directory server 105 can then search the organization chart 110 to locate one or more reports of the contact 121, e.g., "John," and "Jay" shown in FIG. 1A. The directory server 105 can then transmit the located identities and email addresses of the related entities to the email server 106 in a query result 148.

Upon receiving the query result 148 from the directory server 105, the query component 164 of the email engine 160 can be configured to surface the identities (e.g., names) and email addresses of the reports as suggestions 149 to the sender 101a, for instance, to be rendered and surfaced on the email client 140 as a dropdown menu 147 shown in FIG. 2B. Upon receiving a selection of a part or all of the suggestions by the sender 101a, the email client 140 or the email server 106 can be configured to automatically populate the address field 143 with the suggested identities, and email addresses, for instance, as shown in FIG. 2C. In certain embodiments, a "select all" option may be provided as a balloon, popup window, or other suitable types of interface element. In other embodiments, the sender 101a can select the suggestions one at a time. In further embodiments, the suggested email addresses may be automatically populated in the "To:" field, and the sender 101a can delete any of the email addresses the sender does not wish to include. The sender 101a can further utilize the email client 140 to compose the draft email 116 by, for instance, providing a subject line (i.e., "Meeting request") to the subject field 146 and text to the email body 141 (e.g., "Quick meet this Friday?"). The sender 101a can then actuate the "Send" button 144 on the email client 140 to transmit the email 116 to the reports 101b (only one is shown for brevity) of the contact 121.

In further embodiments, various other suitable keywords or key phrases may be used for providing suggestions of reports, managers, co-workers, or other suitable types of related entities to the contact 121. For example, "manages" may be used to indicate the sender's intention to send the email 116 to reports of the contact 121. "Reports to" may be used to indicate the sender's intention to send the email 116 to a manager of the contact 121. "Works with" may be used to indicate the sender's intention to send the email 116 to co-workers of the contact 121. "Supported by" may be used to indicate the sender's intention to send the email 116 to support staff of the contact 121. In yet further embodiments, detecting a keyword or key phrase may be omitted. Instead, in response to detecting "Jeff" in the parsed text 145, Jeff's email and additional options, e.g, "Jeff's directs," "Jeff's manager," may be presented for selection by the sender 101a.

Several embodiments of the disclosed technology can thus allow efficient communications with reports, managers, co-workers, support staff, friends, followers, or other suitable types of related entities to a contact 121. Instead of having to search for identities and email addresses of related entities from an organization chart or other sources and manually entering the email addresses into a draft email 116, the directory server 105 and/or the email server 106 can independently or cooperatively facilitate generation of new emails 116 as well as automatically email address lookup for the related entities. As such, the sender 101a can readily compose and send emails 116 not only to a contact 121, but also to related entities of the contact 121. As a result, compute load, network bandwidth, and/or other suitable types of computing resources at the client device 102 of the sender 101a, the directory server 105, and/or the email server 106 may be reduced.

Though the email address lookup described above with reference to FIGS. 2A-2C is in the context of utilizing the email client 140 with the email interface 142, in other embodiments, aspects of the email address lookup can also be implemented utilizing voice commands to, for instance, a digital assistant (e.g., Microsoft Cortana®, Google Assistant®, Apple Siri®). For example, the sender 101a can speak to the digital assistant, "email Jeff's directs." In response, the digital assistant can be configured to audibly reply with a list of reports of Jeff. When the list is too long (e.g., exceeding a threshold), the response can be abbreviated to be, for instance, "John, Jay, and eight others. Would you like to send a message to all?" The digital assistant can also be configured to read out the entire list upon receiving a request from the sender 101a. As such, the digital assistant can allow the sender 101a to select certain ones from the list or all reports from the entire list.

Figure 3:
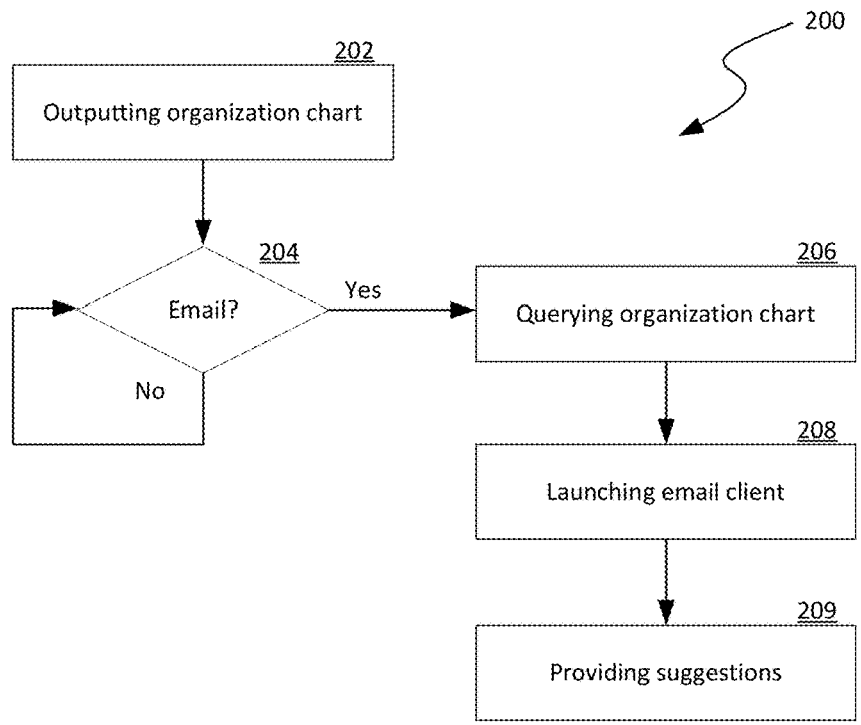
FIGS. 3 and 4 are flowcharts illustrating processes in accordance with embodiments of the disclosed technology.
Figure 4:
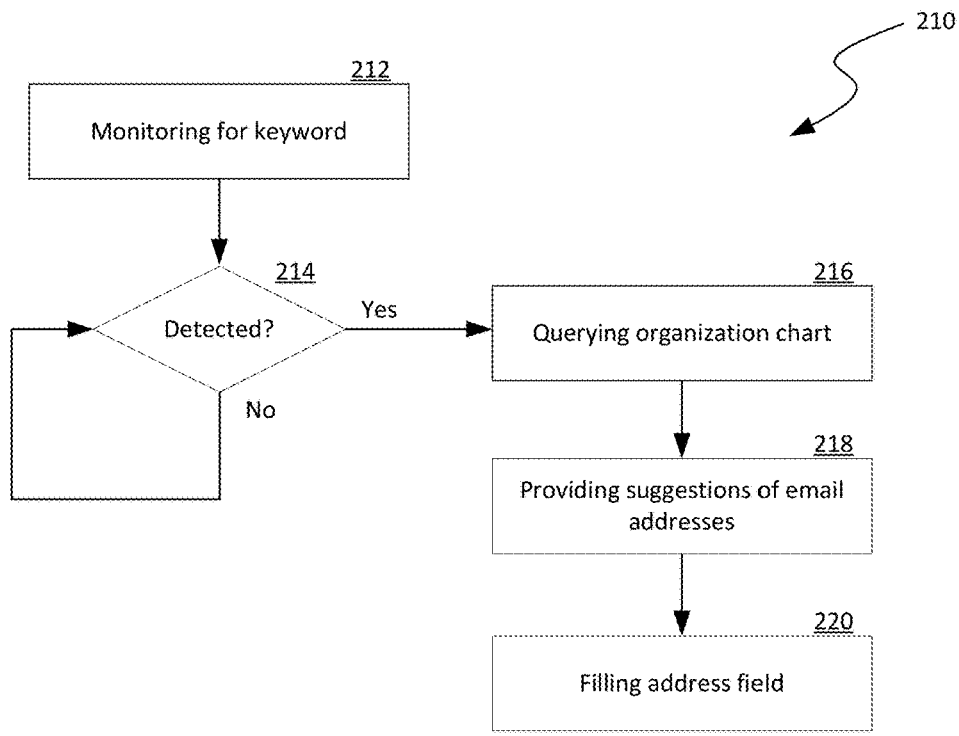

FIGS. 3 and 4 are flowcharts illustrating processes in accordance with embodiments of the disclosed technology. Even though embodiments of the processes are described below in the context of the computing systems 100 and 100' of FIGS. 1A-2C, in other embodiments, the processes can be implemented in computing systems with additional and/or different components.

As shown in FIG. 3, a process 200 for generating suggested email recipients from a user interface of an organization chart can include outputting an organization chart to a user via a client device at stage 202. An example of the organization chart is described above with reference to FIG. 1A. The process 200 can then include a decision stage 204 to determine whether an interface element on the outputted organization chart is actuated to indicate a user intention to email one or more related entities of a contact. Examples of such interface element are also described above with reference to FIG. 1A. In response to determining that the interface element on the outputted organization chart is not actuated, the process 200 reverts to monitoring actuation of the interface element at stage 204. In response to determining that the interface element on the outputted organization chart is actuated, the process 200 can proceed to querying the organization chart for related entities of the contact at stage 206 and launching an email client at stage 208 before providing email addresses of the related entities as suggestions at stage 209, as described above with reference to FIG. 1B.

As shown in FIG. 4, a process 210 for generating suggested email recipients from an email client connected to a directory server can include detecting a preset keyword or key phrases in an address field of a draft email at stage 212. The process 210 can then include a decision stage 214 to determine whether such a preset keyword or key phrase is detected. In response to determining that a preset keyword or key phrase is not detected, the process 210 reverts to monitoring for a preset keyword or key phrase at stage 214. In response to determining that a preset keyword or key phrase is detected, the process 210 proceeds to querying an organization chart for related entities at stage 216, providing query results as suggestions of email addresses at stage 218, and automatically filling the address field with the suggested email addresses at stage 220, as described in more detail above with reference to FIGS. 2B and 2C.

Figure 5:
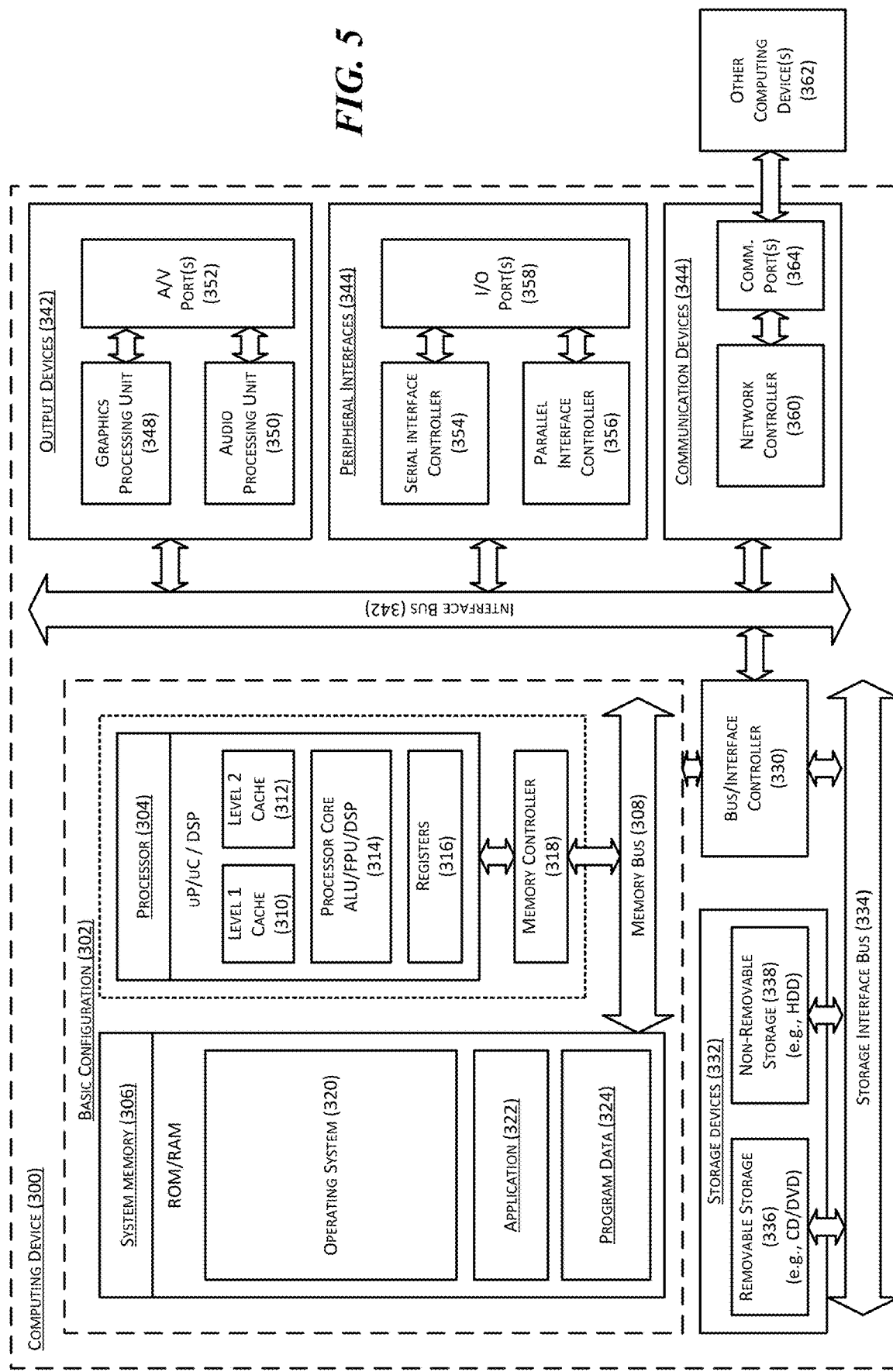
FIG. 5 is a computing device suitable for certain components of the computing system in FIGS. 1A-2B.

FIG. 5 is a computing device 300 suitable for certain components of the computing system 100 or 100' in FIGS. 1A-2C. For example, the computing device 300 can be suitable for the directory server 105, the email server 106, or the client devices 102 of FIGS. 1A-2C. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless webwatch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of facilitating email composition in a computing device, the method comprising:
   detecting, from a user, an input in an address field of a draft email in an email client on the computing device, the user input including a text string comprising a name of a contact and at least one of a preset keyword or a preset key phrase, wherein the text string does not include an email address of the contact; and
   in response to detecting the user input, parsing the text string of the user input to recognize the name of the contact with whom the user previously communicated, based at least in part on contact data associated with the user;
   determining whether the parsed text string contains the preset keyword or the preset key phrase indicating an intention of the user to send the draft email to a related entity of the contact; and
   in response to determining that the parsed text string contains the preset keyword or the preset key phrase,
   querying, via a computer network, a server containing a relationship map corresponding to the contact for an identity and an email address of the related entity of the contact; and
   responsive to receiving a query result from the server, surfacing the identity and the email address of the related entity in the email client as a suggested destination address for selection by the user.

2. The method of claim 1, further comprising responsive to receiving, from the user, a selection of the suggested destination address, inserting the email address in the query result into the address field of the draft email in the email client.

3. The method of claim 1, further comprising:
   detecting a second user input in an address field of a second draft email in the email client on the computing device, the second user input containing a second text string comprising a name of a second contact;
   in response to determining that the second text string does not contain a preset keyword or a preset key phrase,
   searching cached contact data of the second contact for an email address of the second contact; and
   surfacing the email address of the second contact in the email client as a second suggested destination address for selection by the user.

4. The method of claim 1 wherein:
   determining whether the parsed text string also contains the preset keyword or the preset key phrase includes determining whether the parsed text string also contains the preset keyword or the preset key phrase indicating an intention of the user to send the draft email to a report, a manager, a co-worker, or a support staff of the contact in an organization; and
   querying the server includes querying, via the computer network, the server containing an organization chart of the organization corresponding to the contact for an identity and an email address of the report, the manager, the co-worker, or the support staff of the contact.

5. The method of claim 1 wherein:
   determining whether the parsed text string also contains the preset keyword or the preset key phrase includes determining whether the parsed text string also contains the preset keyword or the preset key phrase indicating an intention of the user to send the draft email to a friend, a follower, or a subscriber of the contact in a social network; and
   querying the server includes querying, via the computer network, the server containing a connection map of the social network for an identity and an email address of the friend, the follower, or the subscriber of the contact.

6. The method of claim 1 wherein:
   the email client is a standalone email client executed on the computing device; and
   querying the server includes querying, by the email client and via the computer network, the server containing the relationship map corresponding to the contact for the identity and the email address of the related entity of the contact.

7. The method of claim 1 wherein:
the email client is a web-based email client outputted on the computing device in a web browser executed on the computing device; and
querying the server includes querying, by an email server supporting the web-based email client, the server containing the relationship map corresponding to the contact for the identity and the email address of the related entity of the contact.

8. The method of claim 1 wherein:
querying the server includes querying the server searching the relationship map on the server using the name of the contact as a searching criterion to locate the identity and the email address of the related entity of the contact.

9. The computing device of claim 1, wherein the memory includes additional instructions executable by the processor to cause the computing device to:
determine whether the input also contains a second preset keyword or a second preset key phrase indicating an intention of the user to send the draft email to a second related entity of the contact different than the first related entity of the contact;
in response to determining that the input contains the second preset keyword or the second preset key phrase, query the relationship map corresponding to the contact for an identity and an email address of the second related entity of the contact; and
surface the identity and the email address of the second related entity in the email client as another suggested destination address for selection by the user.

10. A computing device, comprising:
a processor; and
a memory operatively coupled to the processor, the memory containing instructions executable by the processor to cause the computing device to provide an email client and to:
detect, from a user, an input to an address field of a draft email in the email client, the input including a text string comprising a name of a contact and at least one of a preset keyword or a preset key phrase, wherein the text string does not include an email address of the contact;
determine whether the input contains a first preset keyword or a first preset key phrase indicating an intention of the user to send the draft email to a first related entity of the contact; and
in response to determining that the input contains the first preset keyword or the first preset key phrase, query a relationship map corresponding to the contact for an identity and an email address of the first related entity of the contact and surface the identity and the email address of the first related entity in the email client as a suggested destination address for selection by the user.

11. The computing device of claim 10 wherein the memory includes additional instructions executable by the processor to cause the computing device to:
receive, from the user, a selection of the suggested destination address; and
responsive to receiving the selection of the suggested destination address, insert the email address of the first related entity into the address field of the draft email in the email client.

12. The computing device of claim 10 wherein the memory includes additional instructions executable by the processor to cause the computing device to:
detect a second user input in an address field of a second draft email in the email client on the computing device, the second user input containing a second text string comprising a name of a second contact;
in response to determining that the second text string does not contain a preset keyword or a preset key phrase, search cached contact data of the second contact for an email address of the second contact; and
surface the email address of the second contact in the email client as a second suggested destination address for selection by the user.

13. The computing device of claim 10 wherein:
to determine whether the input also contains the first preset keyword or the first preset key phrase includes to determine whether the input also contains the first preset keyword or the first preset key phrase indicating an intention of the user to send the draft email to a report, a manager, a co-worker, or a support staff of the contact in an organization; and
to query the relationship map includes to query, via a computer network, an organization chart of the organization corresponding to the contact for an identity and an email address of the report, the manager, the co-worker, or the support staff of the contact.

14. The computing device of claim 10 wherein:
to determine whether the input also contains the first preset keyword or the first preset key phrase includes to determine whether the input also contains the first preset keyword or the first preset key phrase indicating an intention of the user to send the draft email to a friend, a follower, or a subscriber of the contact in a social network; and
to query the relationship map includes to query, via a computer network, a connection map of the social network for an identity and an email address of the friend, the follower, or the subscriber of the contact.

15. The computing device of claim 10 wherein:
to recognize the contact includes to parse the input as a text string to recognize a name of the contact the user previously communicated with; and
to query the relationship map includes to search the relationship map using the name of the contact as a searching criterion to locate the identity and the email address of the first related entity of the contact.

16. The computing device of claim 10 wherein:
the memory includes additional instructions executable by the processor to cause the computing device to:
determine whether the input also contains a second preset keyword or a second preset key phrase indicating an intention of the user to send the draft email to a second related entity of the contact different than the first related entity of the contact; and
in response to determining that the input also contains the second preset keyword or the second preset key phrase, query, via a computer network, the relationship map corresponding to the contact for an identity and an email address of the second related entity of the contact; and
surface the identity and the email address of the second related entity in the email client as another suggested destination address for selection by the user.

17. A method of facilitating email composition in a computing device interconnected to a directory server by a computer network, the method comprising:

transmitting, from the directory server and via the computer network, an organization chart of an organization to be surfaced on a user interface of the computing device, the user interface being configured to output data representing a first entity of multiple entities in the organization, relationships of the first entity with other ones of the multiple entities, and an interface element associated with a type of organizational relationship in the organization chart, the interface element configured to initiate an email to any of the multiple entities that share the associated relationship with the first entity; and responsive to receiving, from a user, an actuation of the interface element:
- querying the organization chart to identify any of the multiple entities that share the associated relationship with the first entity, and to determine an email address of each identified entity,
- causing the computing device to launch an email client and initiate a draft email in the email client, and
- surfacing the email address of each identified entity as a suggestion on the email client.

18. The method of claim 17, further comprising:
receiving, from the user, a selection of the suggestion; and
in response to receiving the selection, inserting the email address that was surfaced as the suggestion into an address field of the draft email in the email client.

19. The method of claim 17 wherein:
the related entity is a report, a manager, a co-worker, or a support staff of the one of the multiple entities; and
the method further includes receiving, from the user, a second selection indicating an intention of the user to send the draft email to the report, the manager, the co-worker, or the support staff of the one of the multiple entities.

20. The method of claim 17 wherein:
the related entity is a friend, a follower, or a subscriber of the first entity; and
the method further includes receiving, from the user, a second selection indicating an intention of the user to send the draft email to the friend, the follower, or the subscriber of the first entity.

* * * * *